US010161442B2

(12) United States Patent
Kim

(10) Patent No.: US 10,161,442 B2
(45) Date of Patent: Dec. 25, 2018

(54) AIR FOIL BEARINGS HAVING MULTIPLE PADS

(71) Applicant: Board of Regents, The University of Texas System, Austin, TX (US)

(72) Inventor: Daejong Kim, Arlington, TX (US)

(73) Assignee: Board of Regents, The University of Texas System, Austin, TX (US)

( * ) Notice: Subject to any disclaimer, the term of this patent is extended or adjusted under 35 U.S.C. 154(b) by 0 days.

(21) Appl. No.: 15/311,207

(22) PCT Filed: May 15, 2015

(86) PCT No.: PCT/US2015/031125
§ 371 (c)(1),
(2) Date: Nov. 15, 2016

(87) PCT Pub. No.: WO2015/175962
PCT Pub. Date: Nov. 19, 2015

(65) Prior Publication Data
US 2017/0089387 A1    Mar. 30, 2017

Related U.S. Application Data

(60) Provisional application No. 61/994,364, filed on May 16, 2014.

(51) Int. Cl.
*F16C 17/02* (2006.01)
*F16C 43/02* (2006.01)

(52) U.S. Cl.
CPC ............ *F16C 17/024* (2013.01); *F16C 43/02* (2013.01); *F16C 2226/36* (2013.01); *F16C 2226/60* (2013.01); *F16C 2360/23* (2013.01); *F16C 2360/24* (2013.01)

(58) Field of Classification Search
CPC ...... F16C 17/00; F16C 17/024; F16C 17/028; F16C 43/02; F16C 2360/23; F16C 43/24; F16C 2226/36; F16C 2226/60
See application file for complete search history.

(56) References Cited

U.S. PATENT DOCUMENTS

| 3,168,358 A | * | 2/1965 | Buske | ................. F16C 33/06 |
| | | | | 29/898.042 |
| 3,201,183 A | * | 8/1965 | Buske | ................. F16C 33/06 |
| | | | | 384/286 |
| 4,262,975 A | * | 4/1981 | Heshmat | ............. F16C 17/024 |
| | | | | 384/119 |

(Continued)

FOREIGN PATENT DOCUMENTS

| JP | 4322497 B2 | * | 9/2009 | ............ F16C 17/024 |
| JP | 4322497 B2 | | 9/2009 | |

OTHER PUBLICATIONS

Machine Translation of JP 4322497 dated Sep. 2009 (Year: 2009).*

(Continued)

*Primary Examiner* — Alan B Waits
(74) *Attorney, Agent, or Firm* — Thomas | Horstemeyer, LLP

(57) ABSTRACT

In one embodiment, an air foil bearing includes an outer bearing sleeve and multiple inner pads provided within the bearing sleeve, each pad including a top foil and an inner elastic structure that supports the top foil within the bearing sleeve, wherein each pad has an offset ratio that is greater than 0.5.

9 Claims, 6 Drawing Sheets

(56) References Cited

U.S. PATENT DOCUMENTS

| | | | | | |
|---|---|---|---|---|---|
| 4,295,689 | A | * | 10/1981 | Licht | F16C 17/024 384/103 |
| 4,300,806 | A | * | 11/1981 | Heshmat | F16C 17/042 384/103 |
| 4,415,281 | A | * | 11/1983 | Agrawal | F16C 17/024 267/158 |
| 4,462,700 | A | * | 7/1984 | Agrawal | F16C 17/042 384/105 |
| 4,552,466 | A | * | 11/1985 | Warren | F16C 17/024 384/103 |
| 4,815,864 | A | * | 3/1989 | Jones | F16C 17/024 384/103 |
| 4,950,089 | A | * | 8/1990 | Jones | F16C 17/024 384/103 |
| 5,634,723 | A | * | 6/1997 | Agrawal | F16C 17/024 384/103 |
| 5,658,079 | A | * | 8/1997 | Struziak | F16C 17/024 384/106 |
| 5,911,510 | A | * | 6/1999 | Saville | F16C 17/042 384/103 |
| 5,988,885 | A | * | 11/1999 | Heshmat | F16C 17/024 384/106 |
| 6,698,930 | B2 | * | 3/2004 | Akizuki | F16C 17/024 384/106 |
| 7,374,342 | B2 | * | 5/2008 | Yum | F16C 17/024 384/106 |
| 7,494,282 | B2 | * | 2/2009 | Lee | F16C 17/024 384/106 |
| 7,566,174 | B2 | * | 7/2009 | Kurimura | F16C 17/107 384/100 |
| 7,614,792 | B2 | * | 11/2009 | Wade | F16C 17/024 384/103 |
| 8,032,998 | B2 | * | 10/2011 | Kato | F16C 17/024 269/53 |
| 8,353,631 | B2 | * | 1/2013 | Kim | F16C 17/024 384/103 |
| 8,371,799 | B2 | * | 2/2013 | Spathias | F04D 29/056 415/1 |
| 8,419,283 | B2 | * | 4/2013 | McAuliffe | F16C 17/024 384/103 |
| 8,876,389 | B2 | * | 11/2014 | Maier | F16C 39/02 384/114 |
| 8,944,686 | B2 | * | 2/2015 | Omori | F16C 17/024 384/103 |
| 8,944,687 | B2 | * | 2/2015 | Omori | F16C 17/024 384/103 |
| 9,151,322 | B2 | * | 10/2015 | Heshmat | F16C 17/042 |
| 9,726,189 | B2 | * | 8/2017 | Nishida | F16C 17/18 |
| 2006/0018574 | A1 | * | 1/2006 | Kang | F16C 17/024 384/106 |
| 2007/0047858 | A1 | * | 3/2007 | Hurley | F16C 17/024 384/106 |
| 2011/0229065 | A1 | * | 9/2011 | Flora | F16C 32/0603 384/106 |
| 2013/0149140 | A1 | * | 6/2013 | Chang | F04D 25/062 415/229 |
| 2015/0233415 | A1 | * | 8/2015 | Larsen | F16C 17/024 384/103 |
| 2016/0377114 | A1 | * | 12/2016 | Dahinten | F16C 17/024 384/106 |

OTHER PUBLICATIONS

Kim, et al., "Feasibility Study of Oil-Free T700 Rotorcraft Engine: Hybrid Foil Bearing and Nonlinear Rotordynamics", American Helicopter Society 68th Annual Forum, 2012.

Lee, et al., "Analysis of Three-Pad Gas Foil Journal Bearing for Increasing Mechanical Preloads", The Korean Society of Tribologiests and Lubrication Engineers, vol. 30, No. 1, 2014.

Shrikant Yadav, "Dynamic Performance of Offset-Preloaded Two Paid Foil Bearings", Presented to the Faculty of the Graduate School of the University of Texas at Arlington; 2012.

LaTray, et al., "Rotordynamic Performance of a Shaft with Large Overhung Mass Supported by Foil Bearings", Proceedings at ASME Turbo Expo 2016: Turbomachinery Technical Conference and Exposition; Jun. 2016.

Agrawal, et al., "Foil/Air/Gas Bearing Technology—an Overview", International Gas Turbine and Aeroengine Congress and Exhibition, Orlando, FL, Jun. 1997, ASME Paper No. 97-GT-347.

Dykas, B., Bruckner, R., DellaCorte, C., Edmonds, B., and Prahl, J., 2008, "Design, Fabrication, and Performance of Foil Gas Thrust Bearings for Microturbomachinery Applications," ASME Turbo Expo 2008, Berlin, Germany, Jun. 9-13, ASME Paper No. GT2008-50377.

Iordanoff, I., 1999, "Analysis of an Aerodynamic Compliant Foil Thrust Bearing: Method for a Rapid Design," Journal of Tribology, 121(4), pp. 816-822.

Kim, D., 2007, "Parametric Studies on Static and Dynamic Performance of Air Foil Bearings with Different Top Foil Geometries and Bump Stiffness Distributions," ASME Journal of Tribology, 129(2), pp. 354-364.

Lee, D., and Kim, D., 2010, "Thermo-Hydrodynamic Analyses of Bump Air Foil Bearings with Detailed Thermal Model of Foil Structures and Rotor," ASME Journal of Tribology, 132(2), pp. 021704.

Lee, Y., Kim, C. H., Kim, T. H., and Kim, T. Y., 2012, "Effects of Mesh Density on Static Load Performance of Metal Mesh Gas Foil Bearings," Journal of Engineering for Gas Turbines and Power, 134(1), pp. 012502.

Radil, K., and Zeszotek, M., 2004, "An Experimental Investigation into the Temperature Profile of a Compliant Foil Air Bearing," STLE Tribology Transactions, 47(4), pp. 470-479.

Rubio, D., and San Andrés, L., 2006, "Bump-Type Foil Bearing Structural Stiffness: Experiments and Predictions," Journal of Engineering for Gas Turbines and Power, 128(3), pp. 653-660.

Song, J., and Kim, D., 2007, "Foil Gas Bearing with Compression Springs: Analyses and Experiments," ASME Journal of Tribology, 129(3), pp. 628-639.

Heshmat, H., Walowit, J. A., and Pinkus, O., 1983, "Analysis of Gas Lubricated Compliant Thrust Bearings," ASME Journal of Lubrication Technology, 105(4), pp. 638-646.

Ku, C. P., and Heshmat, H., 1994, "Structural Stiffness and Coulomb Damping in Compliant Foil Journal Bearing: Parametric Studies," STLE Tribology Transaction, 37(3), pp. 455-462.

DellaCorte, C., and Valco, M. J., 2000, "Load Capacity Estimation of Foil Air Journal Bearings for Oil-Free Turbo-Machinery Applications," STLE Tribology Transaction, 43(4), pp. 795-801.

Radil, K., Howard, S., and Dykas, B., 2002, "The Role of Radial Clearance on the Performance of Foil Air Bearings," STLE Tribology Transaction, 45(4), pp. 485-490.

Foreign office action for Chinese Patent Application No. 201500254208.

\* cited by examiner

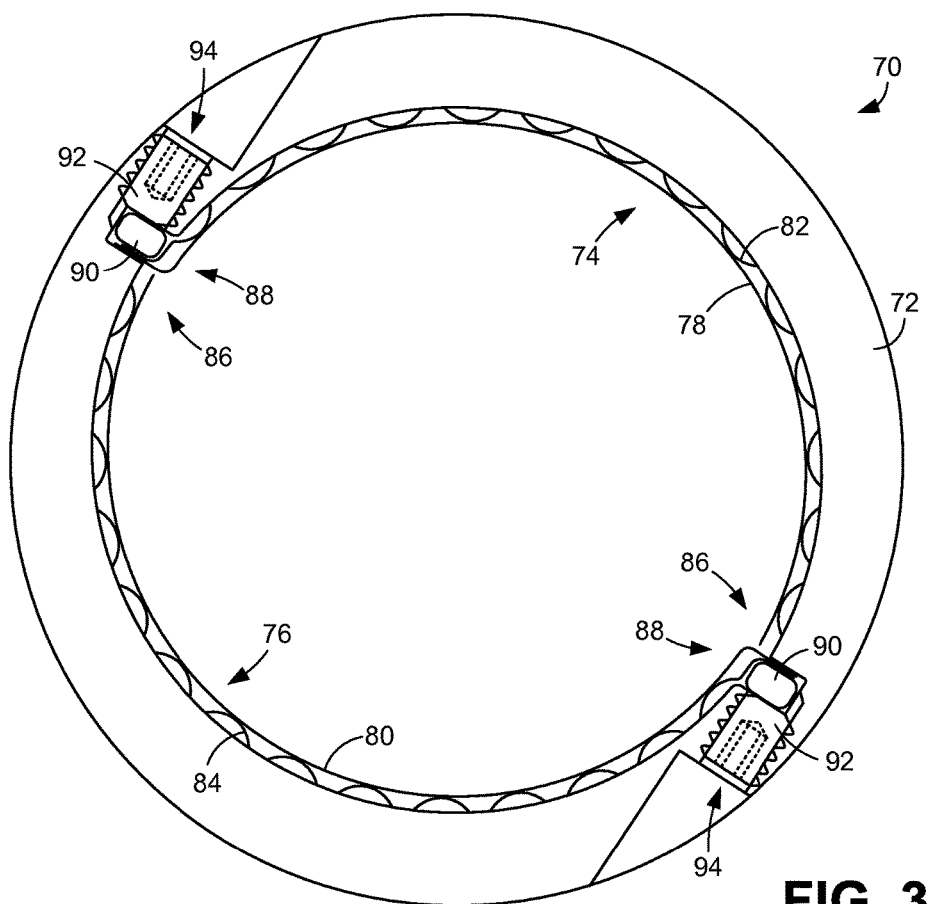
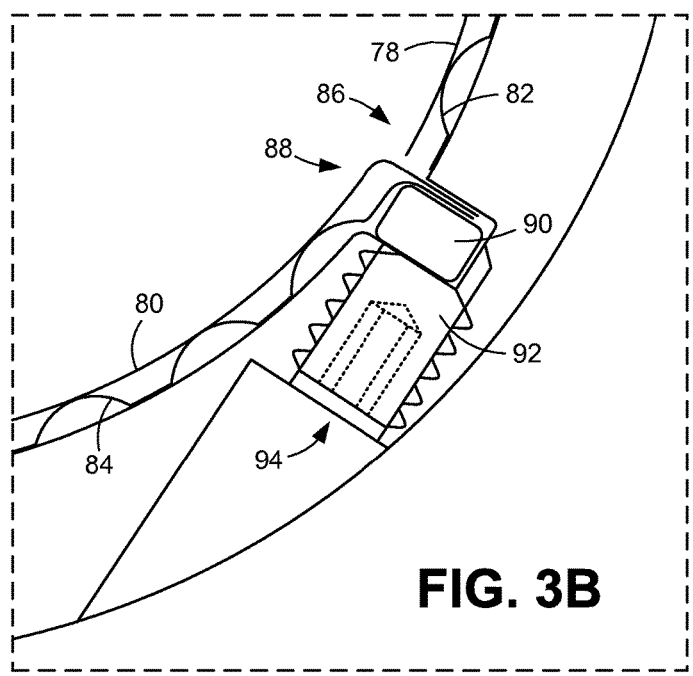

AIR FOIL BEARINGS HAVING MULTIPLE PADS

CROSS-REFERENCE TO RELATED APPLICATION

This application is the 35 U.S.C. § 371 national stage of, and claims priority to and the benefit of, PCT application PCT/US2015/031125, filed May 15, 2015, which claims priority to and the benefit of U.S. Application No. 61/994,364, filed on May 16, 2014, herein incorporated by reference in their entirety.

BACKGROUND

Air foil bearings are a type of hydrodynamic bearing in which a shaft is supported by a compliant, spring-loaded foil that lines a bearing sleeve. When the shaft spins at a high speed, the rotation of the shaft pulls air into the bearing via viscosity effects and forms a high pressure air gap that separates the shaft from the foil such that they do not touch each other.

In the typical air foil bearing, the radial clearance between the foil and the shaft is uniform along the circumferential direction when the bearing is not loaded. When uniform clearance is used, however, the bearing causes the shaft to be dynamically unstable at high speeds. It would be desirable to have an air foil bearing that does not cause such shaft instability.

BRIEF DESCRIPTION OF THE DRAWINGS

The present disclosure may be better understood with reference to the following figures. Matching reference numerals designate corresponding parts throughout the figures, which are not necessarily drawn to scale.

FIG. 3A is an end view of an embodiment of a two-pad air foil bearing having an alternative foil attachment method.

FIG. 3B is a detail view of the two-pad air foil bearing of FIG. 3A that shows the attachment of a top foil to the bearing.

DETAILED DESCRIPTION

As described above, it would be desirable to have an air foil bearing that does not create shaft instability at high speeds. Disclosed herein are air foil bearings that avoid such instability. In some embodiments, the air foil bearings have two pads. In other embodiments, the air foil bearings have three or more pads. In either case, the offset ratio for the pads, which relates to the pad angular width and the location of the minimum set bore film thickness, is greater than 0.5 such that the radial clearance between the pads and the shaft is not uniform along the circumferential direction. This increases the stability of the shaft during rotation.

In the following disclosure, various specific embodiments are described. It is to be understood that those embodiments are example implementations of the disclosed inventions and that alternative embodiments are possible. All such embodiments are intended to fall within the scope of this disclosure.

Figure 1:
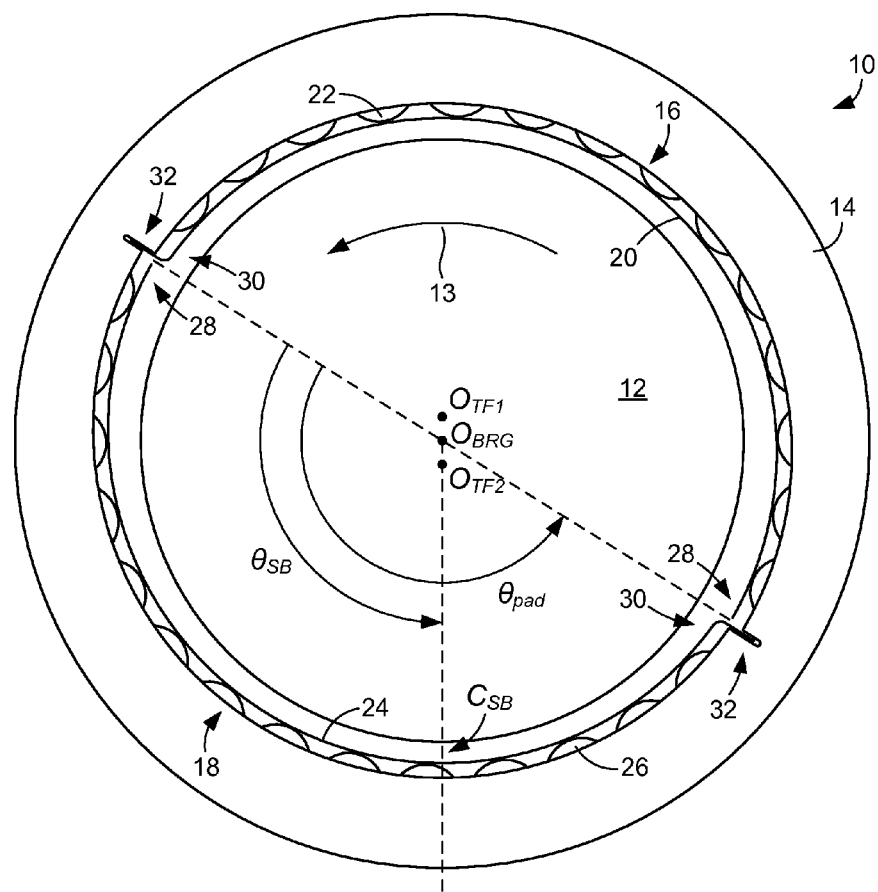
FIG. 1 is an end view of an embodiment of a two-pad air foil bearing.

FIG. 1 illustrates an embodiment of an air foil bearing 10 that is adapted to support a rotatable shaft 12 in a stable manner. The direction of rotation of the shaft 12 is identified by arrow 13. As shown in the figure, the air foil bearing 10 includes an outer bearing sleeve 14 and first and second inner pads 16, 18 that form an inner lining of the sleeve. The first pad 16 comprises a first top foil 20 that is supported by an inner bump foil 22. In a similar manner, the second pad 18 comprises a second top foil 24 that is supported by an inner bump foil 26. The top foils 20, 24 comprise thin sheets of metal, such as steel or a nickel alloy like Inconel 718 or X750. The bump foils 22, 26 are similar in structure to the top foils 20, 24 but are corrugated so as to form "bumps" that are visible in FIG. 1. The top foils 20, 24 together function as a bearing surface of the air foil bearing 10. The bump foils 22, 26 support their associated top foils 20, 24 and serve as elastic foundations that provide not only stiffness but also Coulomb-type (sliding friction) damping to the top foils. While corrugated bump foils are illustrated in FIG. 1 and have been described above, it is noted that alternative elastic structures that serve the same purpose can be used, such as metal meshes, elastomers, viscoelastic materials, and the like.

With further reference to FIG. 1, each top foil 20, 24 has a free leading edge 28 and a trailing edge 30 that is secured to the bearing sleeve 14. In some embodiments, the trailing edges 30 are bent at an approximately 90° angle and extend into longitudinal slots 32 formed along the inside of the bearing sleeve 14. The trailing edges 30 can either be spot welded in place within the slots 32 of the sleeve 14 or can be simply left inserted into the slots so that the top foils 20, 24 can move freely along the radial direction. Regardless of the manner in which trailing edges 30 are connected to the bearing sleeve 14, the leading edge 28 of the second top foil 24 is adjacent the trailing edge 30 of the first top foil 20, and the leading edge 28 of the first top foil is adjacent the trailing edge 30 of the second top foil. In the example illustrated in FIG. 1, the leading edges 28 of the pads 16, 18 are spaced farther away from the shaft 12 than the trailing edges 30. Stated otherwise, the leading edges 28 are closer to the outer bearing sleeve 14 than the trailing edges 30.

As described above, when uniform clearance is used between a shaft and an air foil bearing, the bearing causes the shaft to be dynamically unstable at high speeds. To avoid this instability, the bearing clearance within the air foil bearing 10 is non-uniform. The pad angular width is the angle through which the width of a pad extends within the bearing. The pad angular width of the second pad 18 is identified as $\theta_{pad}$ in FIG. 1. The minimum distance between the pad and the shaft is referred to as the minimum set bore film thickness. The minimum set bore film thickness for the second pad 18 is identified as $C_{SB}$ in FIG. 1. The angular location of the minimum set bore film thickness is identified as $\theta_{SB}$ in FIG. 1. The ratio between the angular location of the minimum set bore film thickness $\theta_{SB}$ and the pad angular width $\theta_{pad}$ is defined as the offset ratio:

$$\gamma = \frac{\theta_{SB}}{\theta_{pad}} \qquad \text{[Equation 1]}$$

As is apparent from FIG. 1, the offset ratio γ for the pads 16, 18 of the air foil bearing 10 is greater than 0.5. In such a case, the thickness of the air film created between the shaft 12 and the pads 16, 18 decreases from the leading edges 28 of the top foils 20, 24 until $\theta_{SB}$ and then increases from $\theta_{SB}$ to the trailing edges 30. In some embodiments, the offset ratio γ is greater than 0.5 but less than 0.7. In other embodiments, the offset ratio γ is greater than 0.7. In the embodiment of FIG. 1, the desired clearance distribution is achieved by designing the bearing sleeve 14 to have a shape that results in that clearance distribution. Alternatively, the desired clearance distribution can be achieved by altering the height of the bump foils 22, 26 along the circumferential direction.

As is also shown in FIG. 1, the radial centers of the first and second top foils $O_{TF1}$ and $O_{TF2}$ are offset from the radial center of the bearing $O_{BRG}$. The distance between these centers is known as the hydrodynamic preload $r_p$. The hydrodynamic preload $r_p$ and offset ratio γ are both design parameters of the bearing 10 and can be selected based on the performance requirement for the bearing.

Figure 2:
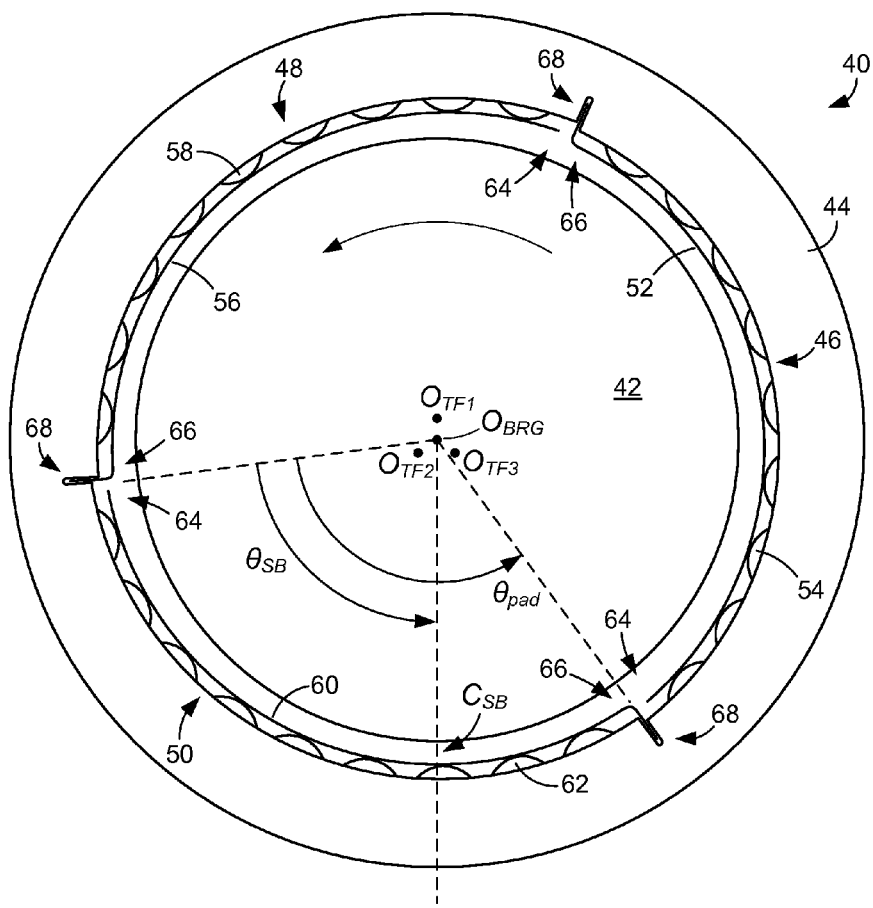
FIG. 2 is an end view of an embodiment of a three-pad air foil bearing.

FIG. 2 illustrates a further embodiment of an air foil bearing 40 that is adapted to support a rotatable shaft 42. The air foil bearing 40 is similar in many ways to the air foil bearing 10 shown in FIG. 1. Accordingly, the air foil bearing 40 includes an outer bearing sleeve 44 and multiple inner pads. In this embodiment, however, the air foil bearing 40 includes three such pads, including a first inner pad 46, a second inner pad 48, and a third inner pad 50. As with the pads of the air foil bearing 10, each pad 46-50 includes a top foil and an inner bump foil. Accordingly, the first pad 46 comprises a first top foil 52 and a bump foil 54, the second pad 48 comprises a second top foil 56 and a bump foil 58, and the third pad 50 comprises a third top foil 60 and a bump foil 62. As before, the top foils 52, 56, 60 together form a bearing surface and the bump foils 54, 58, 62 support their associated top foils. While the air foil bearing 40 comprises three pads 46, 48, 50, it is noted that the bearing can comprise greater than three pads.

With further reference to FIG. 2, each top foil 52, 56, 60 has a free leading edge 64 and a trailing edge 66 that is secured to the bearing sleeve 44. The trailing edges 66 extend into longitudinal slots 68 formed along the inside of the bearing sleeve 44. As is apparent in FIG. 2, the bearing clearance is non-uniform as it was in the two-pad embodiment. In some embodiments, the offset ratio γ is greater than 0.5. In addition, the radial centers of the top foils $O_{TF1}$, $O_{TF2}$, and $O_{TF3}$ are offset from the radial center of the bearing $O_{BRG}$ so as to provide hydrodynamic preload.

The air foil bearings described above in relation to FIGS. 1 and 2 can be modified in various ways. FIGS. 3-6 illustrate examples of such modifications.

Beginning with FIGS. 3A and 3B, shown is a two-pad air foil bearing 70 that is similar in construction to the two-pad air foil bearing 10 shown in FIG. 1. Accordingly, the air foil bearing 70 includes a bearing sleeve 72 that contains two inner pads 74, 76. Each pad comprises a top foil 78, 80, which is supported by a bump foil 82, 84. As with the embodiment of FIG. 1, the offset ratio γ for each pad 74, 76 can be greater than 0.5. Each top foil 78, 80 has a free leading edge 86 and a trailing edge 88 that is secured to the bearing sleeve 14.

As indicated in FIGS. 3A and 3B, the trailing edge 88 of each top foil 78, 80 is attached to the bearing sleeve 72 using a retention key 90 that is secured in place with a set screw 92 that threads into a threaded opening 94 formed in the bearing sleeve.

Figure 4:
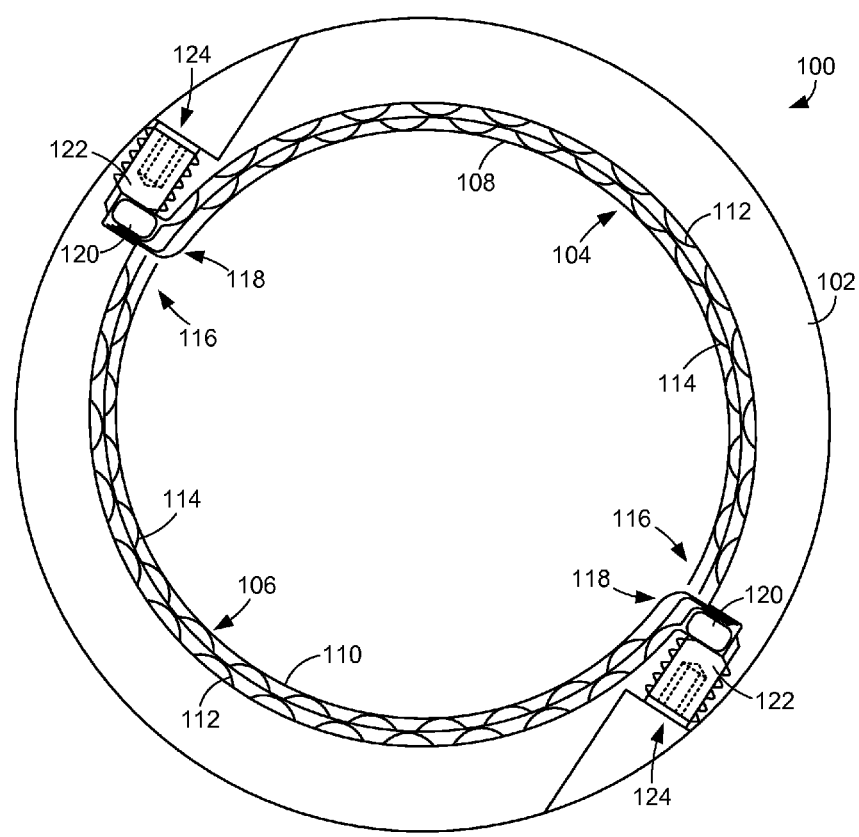
FIG. 4 is an end view of an embodiment of a two-pad air foil bearing having double bump foils.

Turning to FIG. 4, shown is a further two-pad air foil bearing 100 including a bearing sleeve 102 that contains two inner pads 104, 106. Each pad 104, 106 comprises a top foil 108, 110. Instead of being supported by a single bump foil, however, each top foil 108, 110 is supported by two bump foils 112, 114. This provides increased damping for the bearing 100. Each top foil 108, 110 includes a leading edge 116 and a trailing edge 118.

As with the previous embodiment, the trailing edge 118 of each top foil 108, 110 is attached to the bearing sleeve 102 using a retention key 120 that is secured in place with a set screw 122 that threads into a threaded opening 124 formed in the bearing sleeve. As with the embodiment of FIG. 1, the offset ratio γ for each pad 74, 76 can be greater than 0.5.

Figure 5A:
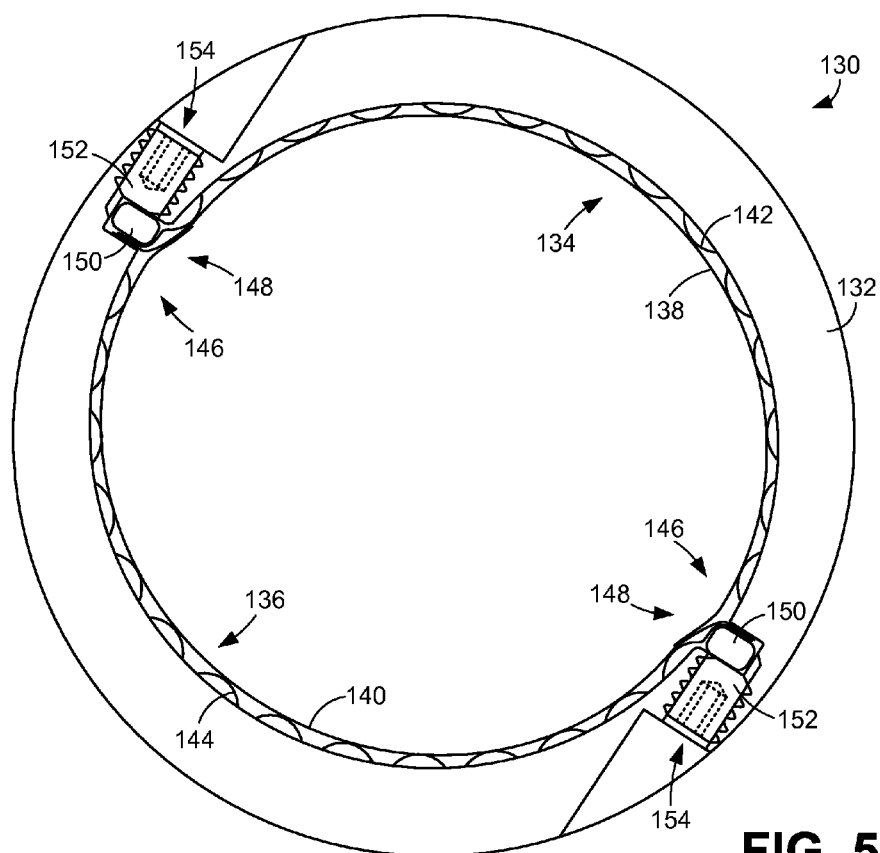
FIG. 5A is an end view of an embodiment of a two-pad air foil bearing in which the leading edges of the foils overlap the trailing edges of the other foils.
Figure 5B:
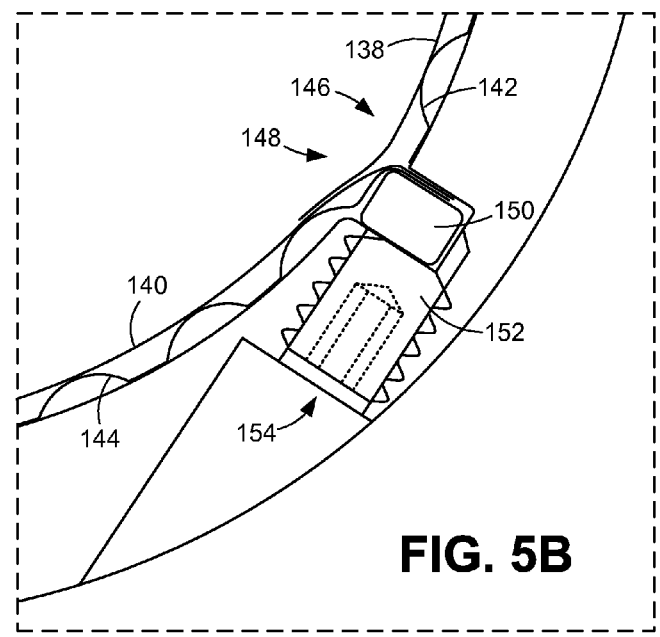
FIG. 5B is a detail view of the two-pad air foil bearing of FIG. 5A that shows attachment of a top foil to the bearing.

Referring next to FIGS. 5A and 5B, shown is a further two-pad air foil bearing 130 including a bearing sleeve 132 that contains two inner pads 134, 136. Each pad 134, 136 comprises a top foil 138, 140, which is supported by a bump foil 142, 144. As with the embodiment of FIG. 1, the offset ratio γ for each pad 74, 76 can be greater than 0.5.

Each top foil 138, 140 includes a leading edge 146 and a trailing edge 148. As is indicated in the figures, the leading edge 146 of each top foil 138, 140 is extended so as to overlap and touch the trailing edge 148 of the other top foil. This provides a larger and more continuous bearing surface for the bearing 130. As is also indicated in the figures, the trailing edge 148 of each top foil 138, 140 is attached to the bearing sleeve 132 using a retention key 150 that is secured in place with a set screw 152 that threads into a threaded opening 154 formed in the bearing sleeve.

Figure 6:
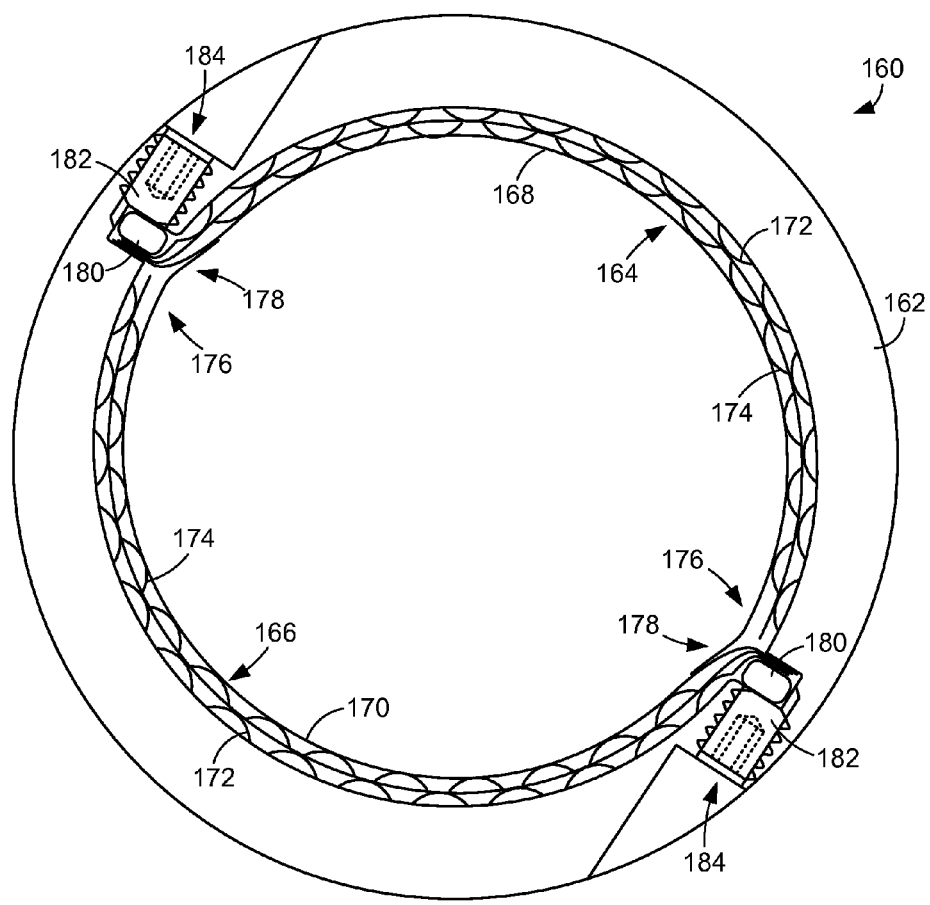
FIG. 6 is an end view of a third embodiment of a two-pad air foil bearing having double bump foils and leading foil edges that overlap trailing foil edges.

Turning to FIG. 6, shown is another two-pad air foil bearing 160 that is a hybrid of the embodiments shown in FIGS. 4 and 5. The air foil bearing 160 includes a bearing sleeve 162 that contains two inner pads 164, 166. Each pad comprises a top foil 168, 170, which is each supported by two bump foils 172, 174. Each top foil 168, 170 includes a leading edge 176 and a trailing edge 178. The leading edge 176 of each top foil 168, 170 is extended so as to overlap and touch the trailing edge 178 of the other top foil. In addition, the trailing edge 178 of each top foil 168, 170 is attached to the bearing sleeve 162 using a retention key 180 that is secured in place with a set screw 182 that threads into a threaded opening 184 formed in the bearing sleeve.

The air foil bearings described in this disclosure can be used in many different applications. Examples include turbo chargers, oil-free turbo compressors/blowers, small gas turbines, small air craft engines, turbo alternators, and motor-driven compressors/blowers.

The invention claimed is:

1. An air foil bearing comprising:
   an outer bearing sleeve having longitudinal slots formed therein;
   multiple inner pads provided within the outer bearing sleeve, each inner pad including a top foil that forms part of a bearing surface of the air foil bearing and an inner elastic structure that supports the top foil within the outer bearing sleeve, each top foil having a leading edge and a trailing edge, each top foil trailing edge extending into one of the longitudinal slots of the outer bearing sleeve;
   multiple retention keys, one retention key being provided in each longitudinal slot of the outer bearing sleeve and being configured to secure an associated top foil trailing edge to the outer bearing sleeve; and multiple set screws, one set screw provided in each longitudinal slot of the outer bearing sleeve that secures an associated retention key in place within the longitudinal slot;

wherein each inner pad has an offset ratio that is greater than 0.5.

2. The air foil bearing of claim 1, wherein the air foil bearing comprises only two inner pads.

3. The air foil bearing of claim 2, wherein the inner pads each have an offset ratio of greater than 0.5 but less than 0.7.

4. The air foil bearing of claim 2, wherein the inner pads each have an offset ratio of greater than 0.7.

5. The air foil bearing of claim 1, wherein the air foil bearing comprises three or more inner pads.

6. The air foil bearing of claim 1, wherein the inner elastic structure comprises an inner corrugated bump foil that is attached to an inner surface of the outer bearing sleeve.

7. The air foil bearing of claim 6, wherein each inner pad comprises two inner corrugated bump foils that support their associated top foil.

8. The air foil bearing of claim 1, wherein the leading edge of the each top foil is closer to the outer bearing sleeve than a bent edge of an adjacent top foil, the bent edge being positioned near the trailing edge of the adjacent top foil.

9. The air foil bearing of claim 1, wherein the leading edge of each top foil overlaps a trailing edge an adjacent top foil.

* * * * *